(12) United States Patent
Hamad et al.

(10) Patent No.: US 11,028,805 B2
(45) Date of Patent: Jun. 8, 2021

(54) SYSTEM AND METHOD FOR ON-BOARD CATALYTIC UPGRADING OF HYDROCARBON FUELS

(71) Applicant: Saudi Arabian Oil Company, Dhahran (SA)

(72) Inventors: Esam Zaki Hamad, Dhahran (SA); Christos Kalamaras, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 154 days.

(21) Appl. No.: 16/243,180

(22) Filed: Jan. 9, 2019

(65) Prior Publication Data

US 2020/0217280 A1 Jul. 9, 2020

(51) Int. Cl.
*F02D 19/06* (2006.01)
*F02D 19/08* (2006.01)
(Continued)

(52) U.S. Cl.
CPC .............. *F02M 27/02* (2013.01); *C10L 1/06* (2013.01); *C10L 10/12* (2013.01);
(Continued)

(58) Field of Classification Search
CPC .......... C10L 2290/141; F02D 19/0607; F02D 19/0649; F02D 19/081; F02D 19/085; F02D 2200/0611; F02M 25/10; F02M 27/02
(Continued)

(56) References Cited

U.S. PATENT DOCUMENTS 4,494,961 A 1/1985 Venkat et al.
5,064,733 A 11/1991 Krist et al.
(Continued)

FOREIGN PATENT DOCUMENTS

EP 0252606 A2 6/1987
JP 2000213444 A 8/2000
(Continued)

OTHER PUBLICATIONS

Al-Sadat, et al., "The O2-assisted Al/Co2 electrochemical cell: A system for CO2 capture/conversion and electric power generation", Applied Sciences and Engineering, pp. 1-10, Jul. 20, 2016.
(Continued)

*Primary Examiner* — Erick R Solis
(74) *Attorney, Agent, or Firm* — Dinsmore & Shohl LLP

(57) ABSTRACT

The present disclosure relates to a vehicle, system, and method for on-board catalytic upgrading of hydrocarbon fuels. In accordance with one embodiment of the present disclosure, a vehicle may include, amongst other things, an internal combustion engine configured to provide motive force to the vehicle, an unreformed fuel subsystem, a reformed fuel subsystem, and a fuel system control architecture. The unreformed fuel subsystem may be structurally configured to transfer unreformed hydrocarbon fuel from the on-board point-of-sale fuel tank to the internal combustion engine. The reformed fuel subsystem may be structurally configured to reform hydrocarbon fuel from the on-board point-of-sale fuel tank and transfer reformed fuel to the internal combustion engine along a reformed fuel supply pathway separated from the unreformed fuel supply pathway. The fuel system control architecture may include a reformate flow control device and a cetane rating controller. The cetane rating controller and the reformate flow control
(Continued)

device may cooperate to deliver an upgraded hydrocarbon fuel to a combustion zone of the internal combustion engine.

19 Claims, 2 Drawing Sheets

(51) Int. Cl.
| | |
|---|---|
| *F02M 25/10* | (2006.01) |
| *F02M 27/02* | (2006.01) |
| *C10L 1/06* | (2006.01) |
| *C10L 10/12* | (2006.01) |
| *F02D 41/00* | (2006.01) |
| *B01J 31/00* | (2006.01) |
| *B60K 15/03* | (2006.01) |
| *B60S 5/02* | (2006.01) |
| *G06Q 20/20* | (2012.01) |

(52) U.S. Cl.
CPC ..... *F02D 19/0607* (2013.01); *F02D 19/0649* (2013.01); *F02D 19/081* (2013.01); *F02D 19/085* (2013.01); *F02D 41/0025* (2013.01); *F02M 25/10* (2013.01); *B01J 31/00* (2013.01); *B60K 15/03* (2013.01); *B60K 2015/03348* (2013.01); *B60S 5/02* (2013.01); *C10L 2270/023* (2013.01); *C10L 2290/141* (2013.01); *C10L 2290/543* (2013.01); *C10L 2290/58* (2013.01); *F02D 2200/0611* (2013.01); *G06Q 20/20* (2013.01)

(58) Field of Classification Search
USPC ...................................... 123/1 A, 3
See application file for complete search history.

(56) References Cited

U.S. PATENT DOCUMENTS

| | | | |
|---|---|---|---|
| 5,316,558 A | 5/1994 | Gonzalez | |
| 5,425,332 A * | 6/1995 | Rabinovich | ............. F02B 43/10 123/3 |
| 5,881,559 A | 3/1999 | Kawamura | |
| 6,230,683 B1 * | 5/2001 | zur Loye | ................. F02B 1/12 123/27 GE |
| 6,332,448 B1 | 12/2001 | Ilyama et al. | |
| 6,378,489 B1 | 4/2002 | Stanglmaier et al. | |
| 6,550,430 B2 * | 4/2003 | Gray | ........................ F02B 1/12 123/27 GE |
| 6,662,760 B1 * | 12/2003 | Stanglmaier | .............. F02B 1/12 123/198 A |
| 6,743,524 B2 | 6/2004 | Schaepkens | |
| 6,981,472 B2 | 1/2006 | Bromberg et al. | |
| 7,017,530 B2 | 3/2006 | Hashimoto et al. | |
| 7,165,512 B2 | 1/2007 | Hashimoto et al. | |
| 7,261,065 B2 | 8/2007 | Aimoto et al. | |
| 7,404,380 B2 | 7/2008 | Hashimoto et al. | |
| 7,737,311 B2 | 6/2010 | Cracknell et al. | |
| 2003/0168024 A1 | 9/2003 | Qian et al. | |
| 2004/0099226 A1 * | 5/2004 | Bromberg | ........... B01J 19/0013 123/3 |
| 2006/0253086 A1 | 11/2006 | Moberg et al. | |
| 2009/0031968 A1 * | 2/2009 | Cracknell | ........... F02D 19/0642 123/3 |
| 2010/0247981 A1 | 9/2010 | Huang | |
| 2011/0247573 A1 | 10/2011 | McCann | |
| 2012/0329657 A1 | 12/2012 | Eastman et al. | |
| 2013/0265522 A1 | 10/2013 | Jung et al. | |
| 2014/0072907 A1 | 3/2014 | Sasaki et al. | |
| 2014/0318106 A1 | 10/2014 | Mizuno et al. | |
| 2014/0357918 A1 | 12/2014 | Klosin et al. | |
| 2020/0216967 A1 | 7/2020 | Archer et al. | |

FOREIGN PATENT DOCUMENTS

| | | |
|---|---|---|
| JP | 2010101194 A | 5/2010 |
| JP | 2010144690 A | 7/2010 |
| JP | 2018003799 A | 1/2018 |
| WO | 2007136496 A2 | 11/2007 |

OTHER PUBLICATIONS

International Search Report and Written Opinion dated Nov. 26, 2019 pertaining to International application No. PCT/US2019/025512 filed Apr. 3, 2019, 18 pgs.

International Search Report and Written Opinion dated Mar. 26, 2020 pertaining to International application No. PCT/US2020/012651 filed Jan. 8, 2020, 14 pgs.

Office Action dated Nov. 12, 2020 pertaining to U.S. Appl. No. 16/241,371, filed Jan. 7, 2019, 24 pgs.

* cited by examiner

SYSTEM AND METHOD FOR ON-BOARD CATALYTIC UPGRADING OF HYDROCARBON FUELS

BACKGROUND

The present disclosure relates to systems and methods for upgrading hydrocarbon fuels, and more particularly to vehicles and non-vehicular systems for on-board catalytic upgrading of hydrocarbon fuels.

BRIEF SUMMARY

According to the subject matter of the present disclosure, vehicles, systems, and methods for the on-board, catalytic upgrading of hydrocarbon fuels are provided.

In accordance with one embodiment of the present disclosure, a vehicle may include an on-board point-of-sale fuel tank, an operator accessible point-of-sale fuel filling port, an internal combustion engine that is configured to provide motive force to the vehicle, an unreformed fuel subsystem, a reformed fuel subsystem, and a fuel system control architecture. The operator accessible point-of-sale fuel filling port may be structurally configured to transfer hydrocarbon fuel from a point-of-sale fuel dispenser to the on-board point-of-sale fuel tank. The unreformed fuel subsystem may be structurally configured to transfer unreformed hydrocarbon fuel from the on-board point-of-sale fuel tank to the internal combustion engine along an unreformed fuel supply pathway. The reformed fuel subsystem may be structurally configured to reform hydrocarbon fuel from the on-board point-of-sale fuel tank and transfer reformed fuel to the internal combustion engine along a reformed fuel supply pathway separated from the unreformed fuel supply pathway. The fuel system control architecture may include a reformate flow control device and a cetane rating controller.

The reformed fuel subsystem may include a catalytic reactor, a diverted hydrocarbon fuel inlet an oxidizing gas inlet, an unreacted oxidizing gas outlet, and a reformed hydrocarbon fuel outlet. The diverted hydrocarbon fuel inlet may be configured to direct a diverted portion of hydrocarbon fuel originating from the on-board point-of-sale fuel tank to the catalytic reactor. The oxidizing gas inlet may be configured to direct an oxidizing gas to the catalytic reactor. The unreacted oxidizing gas outlet may be configured to direct at least a portion of the unreacted oxidizing gas from the catalytic reactor. The reformed hydrocarbon fuel outlet may be configured to direct reformed hydrocarbon fuel to the internal combustion engine.

The catalytic reactor may include a reforming catalyst and may be structurally configured to alter a native cetane rating of the diverted hydrocarbon fuel, in the presence of oxidizing gas, from the oxidizing gas inlet of the reformed fuel subsystem. The cetane rating controller and the reformate flow control device may cooperate to deliver an upgraded hydrocarbon fuel to a combustion zone of the internal combustion engine, by controlling a volumetric ratio of unreformed hydrocarbon fuel from the unreformed fuel subsystem to reformed hydrocarbon fuel from the reformed fuel subsystem.

In accordance with one embodiment of the present disclosure, a method for on-board catalytic upgrading of hydrocarbon fuels may include passing a hydrocarbon fuel along a reformed fuel subsystem from an on-board point-of-sale fuel tank into a catalytic reactor, passing an oxidizing gas through an oxidizing gas inlet into the catalytic reactor. The method may further include, contacting the oxidizing gas, a reforming catalyst, and the hydrocarbon fuel to alter the native cetane rating of the hydrocarbon fuel and thereby produce a reformed hydrocarbon fuel. The method may further include, contacting a volumetric ratio of an unreformed hydrocarbon fuel from the on-board point-of-sale fuel tank with the reformed hydrocarbon fuel to produce an upgraded hydrocarbon fuel, and introducing the upgraded hydrocarbon fuel into a combustion zone of an internal combustion engine.

Although the concepts of the present disclosure are described herein with primary reference to upgrading a hydrocarbon fuel in a vehicle, it is contemplated that the concepts will enjoy applicability to any system where it would be beneficial to upgrade a hydrocarbon fuel stored in the system.

BRIEF DESCRIPTION OF THE SEVERAL VIEWS OF THE DRAWINGS

The following detailed description of specific embodiments of the present disclosure can be best understood when read in conjunction with the following drawing, where like structure is indicated with like reference numerals and in which.

DETAILED DESCRIPTION

Figure 1:
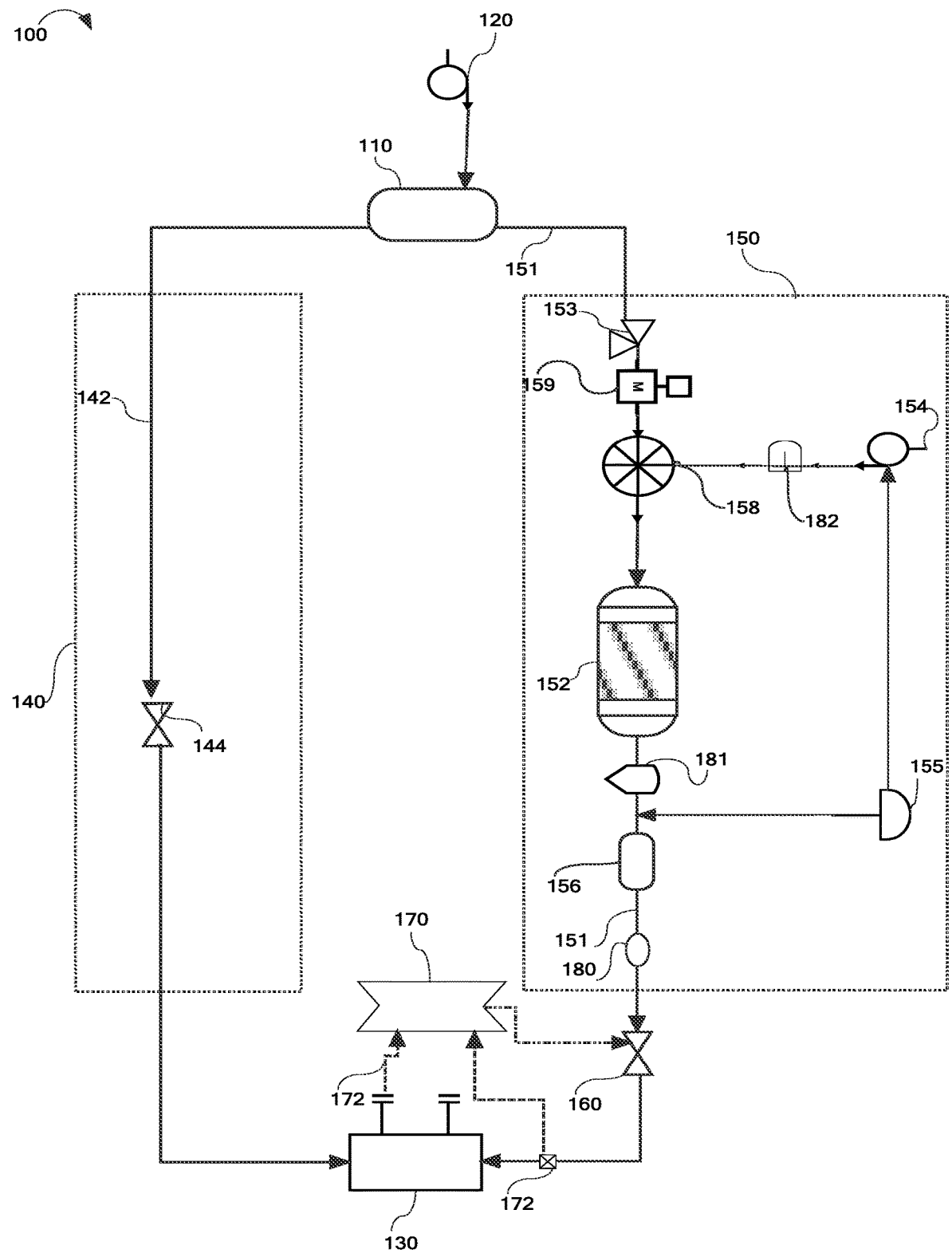
FIG. 1 is a process flow diagram showing a system for the catalytic upgrading of hydrocarbon fuels, according to one or more embodiments presently described.

According to one or more embodiments as described in FIG. 1, a vehicle 100 is provided comprising an on-board point-of-sale fuel tank 110, an operator accessible point-of-sale fuel filling port 120, an internal combustion engine 130 that is configured to provide motive force to the vehicle 100, an unreformed fuel subsystem 140, a reformed fuel subsystem 150, and fuel system control architecture comprising a reformate flow control device 160 and a cetane rating controller 170. It should be understood that the on-board point-of-sale fuel tank 110 refers to a fuel tank that is integrated with, attached to, or is otherwise configured to move with, the vehicle 100, and which may be filled with a purchased fuel.

The operator accessible point-of-sale fuel filling port 120 can be any conventional or yet to be developed fuel filling port that is structurally configured to transfer hydrocarbon fuel from a point-of-sale fuel dispenser to the on-board point-of-sale fuel tank 110. The unreformed fuel subsystem 140 is structurally configured to transfer unreformed hydrocarbon fuel from the on-board point-of-sale fuel tank 110 to the internal combustion engine 130 along an unreformed fuel supply pathway 142. The reformed fuel subsystem 150, which is described in further detail below, is structurally configured to reform hydrocarbon fuel from the on-board point-of-sale fuel tank 110 and transfer reformed fuel to the internal combustion engine 130 along a reformed fuel supply pathway 151 separated from the unreformed fuel supply pathway 142.

The reformed fuel subsystem 150 comprises a catalytic reactor 152, a diverted hydrocarbon fuel inlet 153 configured to direct a diverted portion of hydrocarbon fuel originating from the on-board point-of-sale fuel tank 110 to the catalytic reactor 152, an oxidizing gas inlet 154 configured to direct an oxidizing gas to the catalytic reactor 152, an unreacted oxidizing gas outlet 155 configured to direct at least a portion of an unreacted oxidizing gas from the catalytic reactor 152, and a reformed hydrocarbon fuel outlet configured to direct reformed hydrocarbon fuel to the internal combustion engine 130.

The catalytic reactor 152 comprises a reforming catalyst and is structurally configured to alter a native cetane rating of the diverted hydrocarbon fuel in the presence of oxidizing gas from the oxidizing gas inlet 154 of the reformed fuel subsystem 150. Without being limited by theory, it is believed that oxidation of hydrocarbons may decrease hydrocarbon molecular weights and may result in increased cetane rating. Accordingly, it is believed that the presence of an oxidizing gas at the interface of a hydrocarbon fuel and a catalyst may result in increased cetane ratings for the hydrocarbon fuel.

The cetane rating controller 170 and the reformate flow control device 160 cooperate to deliver an upgraded hydrocarbon fuel to a combustion zone of the internal combustion engine 130 by controlling a volumetric ratio of unreformed hydrocarbon fuel from the unreformed fuel subsystem 140 to reformed hydrocarbon fuel from the reformed fuel subsystem 150.

It should be is noted that an on-board point-of-sale fuel tank 110 and an "operator accessible point-of-sale fuel filling port 120 are presented on a vehicle to facilitate vehicle fueling at a location where an operator executes at least a portion of the fuel dispensing process by transferring fuel to the on-board point-of-sale fuel tank 110 via the operator accessible point-of-sale fuel filling port 120, and where the vehicle operator executes at least a portion of the payment transaction covering the cost of the dispensed fuel. It should be understood that the operator need not directly transfer fuel from the point-of-sale fuel dispenser into the operator accessible point-of-sale fuel filling port 120. For example, in many circumstances, the operator may dispense fuel into an intermediate container such as a gas can or jerry can.

In the embodiment illustrated in FIG. 1, the internal combustion engine 130 provides motive force to the vehicle 100. For example, the internal combustion engine 130 may be coupled to wheels through a transmission or, in the case of a vehicle 100 where the motive force is provided by a propeller, the internal combustion engine 130 may be directly coupled to a propeller. The internal combustion engine 130 may also be configured to provide motive force indirectly such as in a hybrid system that utilizes power from a supply of electrical current supply to supplement the power generated by the internal combustion engine 130. For example, the internal combustion engine 130 may drive a generator and produce electricity; the electricity may then be used to power electric motors which propel the vehicle. The generator and the electric motor may have a variety of power management devices between them, including but not limited to, batteries, capacitors, frequency modulation devices, and variable resistors.

The internal combustion engine 130 may comprise a diesel engine, a gasoline spark ignition engine, a gasoline compression ignition engine, a gasoline homogenous charge compression ignition engine, a premixed controlled auto-ignition engine, or a gasoline spark controlled compression ignition engine. Without being limited by theory, such engines may require differing cetane ratings at different operating parameters. The internal combustion engine 130 may comprise a gasoline homogenous charge compression ignition engine (HCCI). Generally, HCCI engines may have relatively greater fuel efficiencies than gasoline engines and relatively lesser NOx emissions. Generally, HCCI engines may have different cetane rating requirements from other types of gasoline engines. The internal combustion engine 130 may comprise as gasoline spark assisted ignition engine (SACI). According to some embodiments, the internal combustion engine may comprise a diesel engine.

It should be understood that, in some embodiments, no significant chemical modification is expected to occur in the unreformed fuel subsystem 140. The unreformed fuel subsystem 140 may comprise additional equipment such as, without limitation, valves, pumps, filters, and sensors. The unreformed fuel supply pathway 142 may comprise piping and associated equipment to transfer fuel from the on-board point-of-sale fuel tank 110 to the internal combustion engine 130. As used in this disclosure, an unreformed hydrocarbon fuel refers to any hydrocarbon fuel which has the same octane rating as when it was purchased.

It should be understood that the reformed fuel supply pathway 151 and the unreformed fuel supply pathway 142 need not be separated along their entire length. For example, both fuel supply pathways may share a single pipe as they exit the on-board point-of-sale fuel tank 110 and separate before the oxidizing gas inlet 154.

As depicted in FIG. 1, the reformed fuel subsystem 150 may comprise a reformed fuel storage tank 156 in a reformed fuel flow path between the catalytic reactor 152 and the reformed hydrocarbon fuel outlet 180. According to some modes of operation, the catalytic reactor 152 may reform fuel at a different rate than is required by the internal combustion engine 130. For example, the catalytic reactor 152 may reform fuel at a constant rate and the internal combustion engine 130 may require reformed fuel only during periods of peak torque. In these modes of operation it may therefore be preferable to temporarily store reformed fuel in the reformed fuel storage tank 156.

Still referring to FIG. 1, the reformed fuel subsystem may further comprise a liquid-gas separator 157 in the reformed fuel flow path between the catalytic reactor 152 and the unreacted oxidizing gas outlet 155. The liquid-gas separator 157 may be structurally configured to separate unreacted oxidizing gasses from hydrocarbon fuel and direct unreacted oxidizing gasses to the unreacted oxidizing gas outlet 155 of the reformed fuel subsystem 150. The unreacted oxidizing gas may be mixed, entrained, or dissolved in the liquid hydrocarbon fuel. It should be understood that gasses other than oxidizing gasses may be separated from hydrocarbon fuels in the liquid-gas separator, such as carbon dioxide, nitrogen, gaseous hydrocarbons, and carbon monoxide.

According to some embodiments, the catalytic reactor 152 may be structurally configured to separate the unreacted oxidizing gasses from the hydrocarbon fuel and direct the unreacted oxidizing gasses to the unreacted oxidizing gas outlet 155 of the reformed fuel subsystem 150. In such embodiments, the liquid-gas separator 157 may be a region or component of the catalytic reactor 152. Additionally, in such embodiments, the unreacted oxidizing gas outlet 155 may connect directly to the catalytic reactor 152.

The catalytic reactor 152 may alter the native cetane rating of the diverted hydrocarbon fuel by contacting the diverted hydrocarbon fuel with an oxidizing gas and the reforming catalyst. As used in this disclosure, the native cetane rating of a hydrocarbon fuel is the cetane rating of the hydrocarbon fuel as it first enters the on-board point-of-sale fuel tank 110.

Referring further to FIG. 1, according to some embodiments, the reformed fuel subsystem 150 may further comprise a mixing region 158 disposed between the oxidizing gas inlet 154 and the reforming catalyst of the catalytic reactor 152. The reformed fuel subsystem may be configured to introduce the oxidizing gas to the hydrocarbon fuel in the mixing region 158. The mixing region 158 may further comprise one or more of a sparger, a packed column, an impeller, a bubble column, a plate tower, a stirred vessel, a jet-mixed vessel, a static mixer, a jet ejector, a thin film mixer, a slurry reactor, a baffled agitator, or combinations thereof. The mixing region 158 may comprise a dedicated device, as depicted in FIG. 1. The mixing region may comprise a portion of another device. For example, the mixing region may be defined in a portion of the catalytic reactor 152.

The reforming catalyst of the catalytic reactor 152 may comprise one or more metals, metal oxides, organometalics, polyoxometalates, organotransition-metals ions, N-heteroaromatic compounds, N-hydroxy catalytic systems, N-hydroxyphthalimide (NHPI), or any combination thereof. According to some embodiments, the reforming catalyst may comprise a N-hydroxy catalyst. For example, the reforming catalyst may comprise N-hydroxyphthalimide (NHPI). Without being limited by theory, it is believed that N-hydroxy catalyst systems, such as NHPI, may be able to catalyze the selective oxidation of hydrocarbons by molecular oxygen under moderate conditions.

As depicted in FIG. 1 the reformed fuel subsystem 150 may further comprise a catalyst removal device 181. The reforming catalyst may be a homogenous catalyst and the catalyst removal device 181 may be structurally configured to separate the homogenous catalyst from a liquid hydrocarbon fuel. The catalyst removal device 181 may be located along the reformed fuel supply pathway 151 between the catalytic reactor 152 and the liquid-gas separator 157. The catalyst removal device 181 may be located at any point along the reformed fuel supply pathway 151 between the catalytic reactor 152 and the reformed hydrocarbon fuel outlet 180. The catalyst removal device may be defined as a subcomponent of the catalytic reactor 152 or a subcomponent of the liquid-gas separator 157. It should be understood that a homogenous catalyst is a catalyst which is capable of forming a mixture with one or more of reactants, products, or solvents. The homogenous catalyst may form a solution requiring chemical separation or it may be a suspension capable of separation through mechanical means. The catalyst removal device may operate on distillation, adsorption, filtration, settling, or magnetism.

The oxidizing gas inlet 154 may be structurally configured to introduce air into the reformed fuel subsystem 150. The oxidizing gas inlet 154 may be structurally configured to introduce air into the reformed fuel subsystem 150 via the mixing region 158 or upstream of the mixing region 158.

The oxidizing gas inlet 154 may further comprise an oxygen enrichment device 182. According to some embodiments, the oxidizing gas inlet 154 and the oxygen enrichment device 182 may be structurally configured to cooperate to introduce an oxygen enriched gas into the reformed fuel subsystem 150. The oxygen enrichment device may operate on principles of pressure swing adsorption, membrane enrichment, or electrolysis. Without being limited by theory, it is believed that increasing concentrations of oxygen may promote increased reaction rates and decrease excess gas. Excess gas may need to be removed in the liquid-gas separator 157; therefore, avoiding excess gas may decrease system size and cost.

The unreacted oxidizing gas outlet 155 may be structurally configured to direct the unreacted oxidizing gasses to an uncontained atmosphere surrounding the vehicle. As used in this disclosure the term "to" refers to either direct or indirect connections. For example, the unreacted oxidizing gas outlet 155 may direct the unreacted oxidizing gasses through one or more other components before discharging the unreacted oxidizing gasses into an uncontained atmosphere surrounding the vehicle. For example, the unreacted oxidizing gas outlet 155 may direct the unreacted oxidizing gasses through the oxidizing gas inlet 154. Without limitation, the other components may be the internal combustion engine 130, a pollution control device, or a hydrocarbon vapor removal device.

Figure 2:
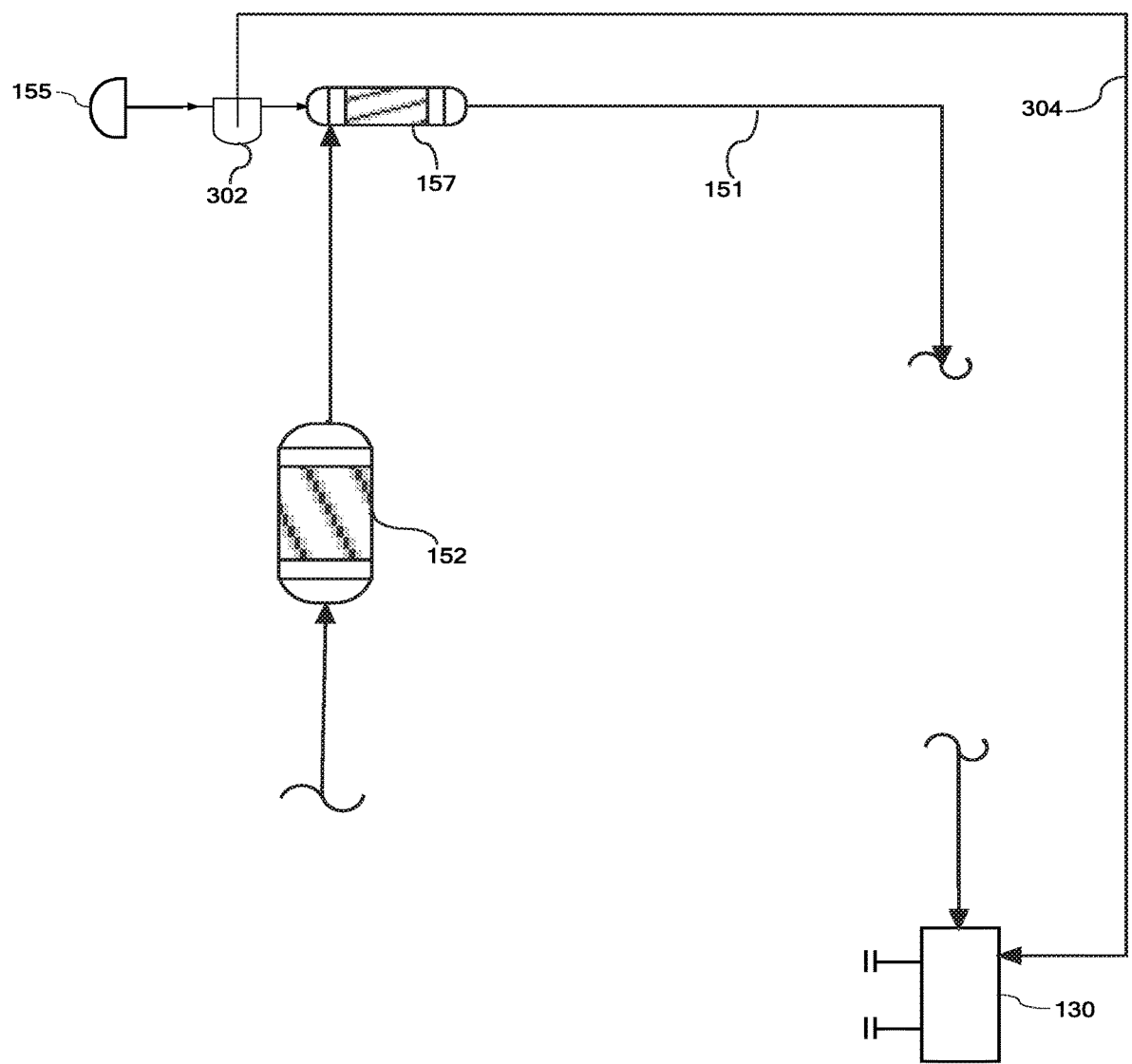
FIG. 2 is a process flow diagram showing one embodiment of a system for the catalytic upgrading of hydrocarbon fuels with an integrated hydrocarbon vapor removal device.

As depicted in FIG. 2, the unreacted oxidizing gas outlet 155 may further comprise a hydrocarbon vapor removal device 302 and a vapor recycle line 304 connecting the hydrocarbon vapor removal device 302 to an intake of the internal combustion engine 130. The hydrocarbon vapor removal device 302 may be structurally configured to separate hydrocarbon vapors from oxidizing gasses and discharge the hydrocarbon vapors into the vapor recycle line 304. It should be understood that the vapor recycle line 304 need not directly connect the hydrocarbon vapor removal device 302 and the intake of the internal combustion engine 130. For example, according to some embodiments, the vapor recycle line 304 may directly connect the hydrocarbon vapor removal device 302 with the on-board point-of-sale fuel tank 110, or with the oxidizing gas inlet 154, or with the reformed fuel storage tank 156, or with the intake of the internal combustion engine 130, or with any point along the respective flow paths defined by the reformed or unreformed fuel subsystems 140, 150.

The hydrocarbon vapor removal device 302 may be structurally configured to chill unreacted oxidizing gas in the unreacted oxidizing gas outlet 155. Without being limited by theory, it is believed that most hydrocarbon vapors may be condensed at relatively lesser temperatures. As such, it may be advantageous to chill the unreacted oxidizing to condense hydrocarbon vapors which may be mixed with the unreacted oxidizing gas. According to some embodiments, the hydrocarbon vapor removal device 302 may be structurally configured to remove hydrocarbon vapor from unreacted gas in the unreacted oxidizing gas outlet 155 through absorption, adsorption, or membrane technology.

The fuel system control architecture may be in communication with an unreformed fuel flow control device 144 and a reformed fuel supply pump 159. The reformate flow control device 160 may be disposed within the reformed fuel subsystem. The reformate flow control device 160 may comprise one or both of pumps or valves.

The cetane rating controller 170 may be a stand-alone controller or a controller integrated with a controller that is programmed to execute additional functionality. For example, the stand alone controller may be a device dedicated to the control of cetane rating. For example, The controller programmed to execute additional functionality may be an engine control unit.

According to some embodiments, the cetane rating controller 170 may be programmed to determine the desired cetane rating at least in part from a lookup table and deliver the upgraded hydrocarbon fuel by controlling the volumetric ratio of unreformed hydrocarbon fuel to reformed hydrocarbon fuel as a function of the desired cetane rating. As used in this disclosure, the desired cetane rating refers to an optimal cetane rating calculated based on engine operating parameters. Relevant engine operating parameters may include without limitation, throttle position, coolant temperature, intake air pressure, intake air temperature, instantaneous torque, revolutions per minute, or timing advance.

According to some embodiments, the cetane rating controller 170 may be programmed to determine the delivered cetane rating at least in part from a lookup table. As used in this disclosure, the delivered cetane rating is the average cetane rating of the fuel inside the combustion zone of an internal combustion engine 130. Generally, it may be possible to calculate the delivered cetane rating of the reformed fuel based on properties such as unreformed fuel cetane rating, catalyst activity, catalytic reactor temperature, flux at the oxidizing gas inlet, and catalyst age. Generally, empirical data on these parameters may be combined to calculate an expected value for the delivered cetane rating.

The fuel system control architecture may further comprise a cetane rating sensor feedback loop 172 in communication with the cetane rating controller 170. According to some embodiments, the cetane rating controller may be programmed to utilize the cetane rating sensor feedback loop 172 to at least partially control the volumetric ratio of unreformed hydrocarbon fuel to reformed hydrocarbon fuel. In the present configuration, the cetane rating sensor feedback loop 172 and the cetane rating controller 170 may cooperate to ensure reliable control of the delivered cetane rating. It should be understood that, the cetane rating sensor feedback loop may comprise one or more dedicated sensors, one or more multipurpose sensors, one or more calculated values, or any combination thereof. For example, according to some embodiments, the cetane rating sensor feedback loop may comprise one or more of combustion pressure sensors or measurements, engine timing sensors or measurements, engine dynamic torque sensors or measurements, density sensors or measurements, or distillation properties. Generally, the cetane rating of a hydrocarbon fuel may be calculated based on density and distillation properties. Alternatively, the cetane rating of a hydrocarbon fuel may be determined through the measurement of engine properties as the hydrocarbon fuel is used in the engine.

The reformate flow control device 160 may comprise a single flow control valve positioned in the reformed fuel subsystem. The reformate flow control device 160 may comprise a plurality of flow control valves positioned in the reformed fuel subsystem, the unreformed fuel subsystem, or both. It should be understood that the reformate flow control device may be located at any point along the reformed fuel supply pathway, not just at reformate flow control device 160 as indicated in FIG. 1.

The reformate flow control device 160 may comprise one or more pumps positioned in the reformed fuel subsystem 150, the unreformed fuel subsystem 140 or both. Generally, flow control in a closed system may be achieved without valves. As such, it is possible to use one or more pumps to achieve optimal flow control. It should be understood that the reformate flow control device 160 may be located at any point along the reformed fuel supply pathway 151, not just at reformed fuel supply pump 159 as indicated in FIG. 1.

As used in this disclosure, the delivered fuel refers to the fuel which reaches the combustion zone of the internal combustion engine. As used in this disclosure, an upgraded hydrocarbon fuel is one which has a higher cetane rating relative to the native cetane rating of the hydrocarbon fuel.

The volumetric ratio may be controlled by controlling one or both of the flow in the reformed fuel subsystem 150 and the flow in the unreformed fuel subsystem 140. The fuel system control architecture may be structurally configured to control the volumetric ratio by controlling volumetric delivery of both unreformed and reformed hydrocarbon fuel to the internal combustion engine 130. The fuel system control architecture may be structurally configured to control the volumetric ratio by controlling volumetric delivery of reformed hydrocarbon fuel to the internal combustion engine 130.

The reformed fuel and the unreformed fuel may be mixed anywhere between the outlet of the catalytic reactor 152 and the combustion zone of the internal combustion engine 130. The fuel system control architecture may be structurally configured to control the volumetric ratio at a fuel delivery port of the internal combustion engine 130 or at a fuel mixing point upstream of the fuel delivery port of the internal combustion engine 130. The fuel system control architecture may be structurally configured to control the volumetric ratio by controlling fuel delivery to separate reformed and unreformed fuel delivery ports of the internal combustion engine 130. As used presently, volumetric ratio refers to the ratio of reformed hydrocarbon fuel to unreformed hydrocarbon fuel.

According to some embodiments, the vehicle 100 may comprise an exhaust gas recycle system. The exhaust gas recycle system may be structurally configured to capture at least a portion of an exhaust gas originating from the internal combustion engine 130 and direct at least a portion of the captured exhaust gas to a combustion zone of the internal combustion engine 130. Without being limited by theory, an exhaust gas recycle system may be used to decrease the NOx emissions of an internal combustion engine by decreasing the $O_2$ concentration of the incoming air.

According to some embodiments, the unreacted oxidizing gas outlet 155 may be structurally configured to direct at least a portion of the unreacted oxidizing gasses to a combustion zone of the internal combustion engine 130. Without being limited by theory, it is believed that the unreacted oxidizing gas outlet may contain gas with a lower oxygen concentration than ambient air. It is therefore believed that introducing the at least a portion of the unreacted oxidizing gasses into a combustion zone of the internal combustion engine 130 may decrease oxygen concentrations in the combustion zone of the internal combustion engine and accordingly decrease the $NO_x$ emissions from the internal combustion engine exhaust.

As used in this disclosure, cetane rating is an indicator of the combustion speed and compression needed for ignition of a hydrocarbon fuel. While cetane rating is commonly applied to diesel fuels, a cetane rating may be determined for any fuel. For example, a cetane rating may be determined for diesel, gasoline, kerosene, or naphtha.

According to some embodiments, a method for on-board catalytic upgrading of hydrocarbon fuels may comprise passing a hydrocarbon fuel along a reformed fuel subsystem 150 from an on-board point-of-sale fuel tank 110 into a catalytic reactor 152 and passing an oxidizing gas through an oxidizing gas inlet 154 into the catalytic reactor 152. The oxidizing gas, a reforming catalyst, and the hydrocarbon fuel may then be contacted to alter the native cetane rating of the hydrocarbon fuel and thereby produce a reformed hydrocarbon fuel. A volumetric ratio of an unreformed hydrocarbon fuel from the on-board point-of-sale fuel tank 110 may then be contacted with the reformed hydrocarbon fuel to produce an upgraded hydrocarbon fuel. The upgraded hydrocarbon fuel may be introduced into a combustion zone of an internal combustion engine 130.

It is noted that recitations herein of a component of the present disclosure being "structurally configured," "configured," or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A vehicle comprising
an on-board point-of-sale fuel tank,
an operator accessible point-of-sale fuel filling port that is structurally configured to transfer hydrocarbon fuel from a point-of-sale fuel dispenser to the on-board point-of-sale fuel tank,
an internal combustion engine that is configured to provide motive force to the vehicle,
an unreformed fuel subsystem that is structurally configured to transfer unreformed hydrocarbon fuel from the on-board point-of-sale fuel tank to the internal combustion engine along an unreformed fuel supply pathway,
a reformed fuel subsystem that is structurally configured to reform hydrocarbon fuel from the on-board point-of-sale fuel tank and transfer reformed fuel to the internal combustion engine along a reformed fuel supply pathway separated from the unreformed fuel supply pathway, and
fuel system control architecture comprising a reformate flow control device and a cetane rating controller, wherein:
the reformed fuel subsystem comprises a catalytic reactor, a diverted hydrocarbon fuel inlet configured to direct a diverted portion of hydrocarbon fuel originating from the on-board point-of-sale fuel tank to the catalytic reactor, an oxidizing gas inlet configured to direct an oxidizing gas to the catalytic reactor, an unreacted oxidizing gas outlet configured to direct at least a portion of an unreacted oxidizing gas from the catalytic reactor, and a reformed hydrocarbon fuel outlet configured to direct reformed hydrocarbon fuel to the internal combustion engine;
the catalytic reactor comprises a reforming catalyst and is structurally configured to alter a native cetane rating of the diverted hydrocarbon fuel in the presence of oxidizing gas from the oxidizing gas inlet of the reformed fuel subsystem;
the unreacted oxidizing gas outlet further comprises a hydrocarbon vapor removal device and a vapor recycle line connecting the hydrocarbon vapor removal device to an intake of the internal combustion engine where the hydrocarbon vapor removal device is structurally configured to separate hydrocarbon vapors from unreacted oxidizing gasses and discharge the hydrocarbon vapors into the vapor recycle line; and
the cetane rating controller and the reformate flow control device cooperate to deliver an upgraded hydrocarbon fuel to a combustion zone of the internal combustion engine by controlling a volumetric ratio of unreformed hydrocarbon fuel from the unreformed fuel subsystem to reformed hydrocarbon fuel from the reformed fuel subsystem.

2. The vehicle of claim 1, wherein the reformed fuel subsystem comprises a reformed fuel storage tank in a reformed fuel flow path between the catalytic reactor and the reformed hydrocarbon fuel outlet.

3. The vehicle of claim 1, wherein:
the reformed fuel subsystem further comprises a liquid-gas separator in the reformed fuel flow path between the catalytic reactor and the reformed hydrocarbon fuel outlet; and
the liquid-gas separator is structurally configured to separate unreacted oxidizing gasses from hydrocarbon fuel and direct unreacted oxidizing gasses to the unreacted oxidizing gas outlet of the reformed fuel subsystem.

4. The vehicle of claim 1, wherein the fuel system control architecture is structurally configured to control the volumetric ratio by controlling volumetric delivery of both unreformed hydrocarbon fuel and reformed hydrocarbon fuel to the internal combustion engine.

5. The vehicle of claim 1, wherein the fuel system control architecture is structurally configured to control the volumetric ratio by controlling volumetric delivery of reformed hydrocarbon fuel to the internal combustion engine.

6. The vehicle of claim 1, wherein the fuel system control architecture is structurally configured to control the volumetric ratio at one or more fuel delivery ports of the internal combustion engine or at a fuel mixing point upstream of the one or more fuel delivery ports of the internal combustion engine.

7. The vehicle of claim 1, wherein the cetane rating controller is a stand-alone controller or a controller integrated with a controller that is programmed to execute additional functionality.

8. The vehicle of claim 1, wherein the cetane rating controller is programmed to:
determine a desired cetane rating at least in part from a lookup table; and
deliver the upgraded hydrocarbon fuel by controlling the volumetric ratio of unreformed hydrocarbon fuel to reformed hydrocarbon fuel as a function of the desired cetane rating.

9. The vehicle of claim 1, wherein:
the fuel system control architecture further comprises a cetane rating sensor feedback loop in communication with the cetane rating controller; and
the cetane rating controller is programmed to utilize the cetane rating sensor feedback loop to at least partially control the volumetric ratio of unreformed hydrocarbon fuel to reformed hydrocarbon fuel.

10. The vehicle of claim 1, wherein:
the reformed fuel subsystem further comprises a mixing region disposed between the oxidizing gas inlet and the reforming catalyst; and the reformed fuel subsystem is configured to introduce the oxidizing gas to the hydrocarbon fuel in the mixing region.

11. The vehicle of claim 1, wherein:
the oxidizing gas inlet further comprises an oxygen enrichment device; and
the oxidizing gas inlet and the oxygen enrichment device are structurally configured to cooperate to introduce an oxygen enriched gas into the reformed fuel subsystem.

12. The vehicle of claim 1, wherein the vehicle comprises an exhaust gas recycle system that is structurally configured to capture at least a portion of an exhaust gas originating from the internal combustion engine and direct at least a portion of the captured exhaust gas to a combustion zone of the internal combustion engine.

13. The vehicle of claim 12, wherein the unreacted oxidizing gas outlet is structurally configured to direct at least a portion of the unreacted oxidizing gasses to the combustion zone of the internal combustion engine.

14. The vehicle of claim 1, wherein the reforming catalyst comprises a N-hydroxy catalyst.

15. The vehicle of claim 1, wherein the reforming catalyst comprises one or more metals, metal oxides, organometalics, polyoxometalates, organotransition-metals ions, N-heteroaromatic compounds, N-hydroxy catalytic systems, or any combination thereof.

16. The reformed fuel subsystem of claim 1, further comprising a catalyst removal device, wherein:
the reforming catalyst is a homogenous catalyst; and
the catalyst removal device is structurally configured to separate the homogenous catalyst from a liquid hydrocarbon fuel.

17. The vehicle of claim 1, wherein:
the reformed fuel subsystem further comprises a liquid-gas separator in the reformed fuel flow path between the catalytic reactor and the reformed hydrocarbon fuel outlet;
the liquid-gas separator is structurally configured to separate unreacted oxidizing gasses from hydrocarbon fuel and direct unreacted oxidizing gasses to the unreacted oxidizing gas outlet of the reformed fuel subsystem;
the fuel system control architecture further comprises a cetane rating sensor feedback loop in communication with the cetane rating controller;
the cetane rating controller is programmed to utilize the cetane rating sensor feedback loop to at least partially control the volumetric ratio of unreformed hydrocarbon fuel to reformed hydrocarbon fuel;
the reformed fuel subsystem further comprises a mixing region disposed between the oxidizing gas inlet and the reforming catalyst;
the reformed fuel subsystem is configured to introduce the oxidizing gas to the hydrocarbon fuel in the mixing region;
the unreacted oxidizing gas outlet further comprises a hydrocarbon vapor removal device and a vapor recycle line connecting the hydrocarbon vapor removal device to an intake of the internal combustion engine;
the hydrocarbon vapor removal device is structurally configured to separate hydrocarbon vapors from unreacted oxidizing gasses and discharge the hydrocarbon vapors into the vapor recycle line;
the oxidizing gas inlet further comprises an oxygen enrichment device; and
the oxidizing gas inlet and the oxygen enrichment device are structurally configured to cooperate to introduce an oxygen enriched gas into the reformed fuel subsystem.

18. A system comprising:
a point-of-sale fuel tank,
an operator accessible point-of-sale fuel filling port that is structurally configured to transfer hydrocarbon fuel from a point-of-sale fuel dispenser to the point-of-sale fuel tank,
an internal combustion engine,
an unreformed fuel subsystem that is structurally configured to transfer unreformed hydrocarbon fuel from the point-of-sale fuel tank to the internal combustion engine along an unreformed fuel supply pathway,
a reformed fuel subsystem that is structurally configured to reform hydrocarbon fuel from the point-of-sale fuel tank and transfer reformed fuel to the internal combustion engine along a reformed fuel supply pathway separated from the unreformed fuel supply pathway, and
fuel system control architecture comprising a reformate flow control device and a cetane rating controller, wherein:
the reformed fuel subsystem comprises a catalytic reactor, a diverted hydrocarbon fuel inlet configured to direct a diverted portion of hydrocarbon fuel originating from the point-of-sale fuel tank to the catalytic reactor, an oxidizing gas inlet configured to direct an oxidizing gas to the catalytic reactor, an unreacted oxidizing gas outlet configured to direct at least a portion of an unreacted oxidizing gas from the catalytic reactor, and a reformed hydrocarbon fuel outlet configured to direct reformed hydrocarbon fuel to the internal combustion engine;
the catalytic reactor comprises a reforming catalyst and is structurally configured to alter a native cetane rating of the diverted hydrocarbon fuel in the presence of oxidizing gas from the oxidizing gas inlet of the reformed fuel subsystem;
the unreacted oxidizing gas outlet further comprises a hydrocarbon vapor removal device and a vapor recycle line connecting the hydrocarbon vapor removal device to an intake of the internal combustion engine where the hydrocarbon vapor removal device is structurally configured to separate hydrocarbon vapors from unreacted oxidizing gasses and discharge the hydrocarbon vapors into the vapor recycle line; and
the cetane rating controller and the reformate flow control device cooperate to deliver an upgraded hydrocarbon fuel to a combustion zone of the internal combustion engine by controlling a volumetric ratio of unreformed hydrocarbon fuel from the unreformed fuel subsystem to reformed hydrocarbon fuel from the reformed fuel subsystem.

19. A method for on-board catalytic upgrading of hydrocarbon fuels, the method comprising:
passing a hydrocarbon fuel along a reformed fuel subsystem from an on-board point-of-sale fuel tank into a catalytic reactor;
passing an oxidizing gas through an oxidizing gas inlet into the catalytic reactor;
contacting the oxidizing gas, a reforming catalyst, and the hydrocarbon fuel to alter the native cetane rating of the hydrocarbon fuel and thereby produce a reformed hydrocarbon fuel;
passing an unreacted oxidizing gas from the catalytic reactor into a hydrocarbon vapor removal device and separating hydrocarbon vapors from the unreacted oxidizing gas;

discharging the hydrocarbon vapors separated from the unreacted oxidizing gas into a vapor recycle line connecting the hydrocarbon vapor removal device to an intake of the internal combustion engine;

contacting an unreformed hydrocarbon fuel from the on-board point-of-sale fuel tank with the reformed hydrocarbon fuel at a controlled volumetric ratio to produce an upgraded hydrocarbon fuel; and introducing the upgraded hydrocarbon fuel into a combustion zone of an internal combustion engine.

* * * * *